(12) United States Patent
You et al.

(10) Patent No.: US 12,244,029 B2
(45) Date of Patent: Mar. 4, 2025

(54) BATTERY MODULE AND BATTERY PACK COMPRISING BATTERY MODULE

(71) Applicant: LG CHEM, LTD., Seoul (KR)

(72) Inventors: Jung-Been You, Daejeon (KR); Dal-Mo Kang, Daejeon (KR); Min-Ho Kwon, Daejeon (KR); Jeong-O Mun, Daejeon (KR); Jae-Uk Ryu, Daejeon (KR); Jung-Hoon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 764 days.

(21) Appl. No.: 17/268,306

(22) PCT Filed: Sep. 11, 2019

(86) PCT No.: PCT/KR2019/011825
§ 371 (c)(1),
(2) Date: Feb. 12, 2021

(87) PCT Pub. No.: WO2020/060108
PCT Pub. Date: Mar. 26, 2020

(65) Prior Publication Data
US 2021/0305651 A1   Sep. 30, 2021

(30) Foreign Application Priority Data
Sep. 20, 2018   (KR) .................. 10-2018-0113243

(51) Int. Cl.
H01M 50/238   (2021.01)
B60L 50/64   (2019.01)
(Continued)

(52) U.S. Cl.
CPC ..... *H01M 50/238* (2021.01); *H01M 10/0413* (2013.01); *H01M 10/0481* (2013.01);
(Continued)

(58) Field of Classification Search
CPC .......................... H01M 50/242; H01M 50/271
See application file for complete search history.

(56) References Cited

U.S. PATENT DOCUMENTS

| 8,574,750 | B2 | 11/2013 | Tsutsumi et al. | |
| 2011/0151309 | A1* | 6/2011 | Park .................... | H01M 10/052 429/151 |

(Continued)

FOREIGN PATENT DOCUMENTS

| CN | 202601732 U | 12/2012 |
| CN | 210723128 U | 6/2020 |

(Continued)

OTHER PUBLICATIONS

Extended European Search Report issued Sep. 7, 2021 in Application No. 19863210.1.
(Continued)

*Primary Examiner* — Gregg Cantelmo
(74) *Attorney, Agent, or Firm* — Birch, Stewart, Kolasch & Birch, LLP

(57) ABSTRACT

A battery module includes a battery cell assembly having a plurality of battery cells stacked on each other, a pair of end plates provided at both sides of the battery cell assembly; and a cover frame coupled to the pair of end plates to cover the battery cell assembly, the cover frame being deformed along an inflating direction of the plurality of battery cells when the plurality of battery cells are inflated.

13 Claims, 8 Drawing Sheets

(51) Int. Cl.
  *H01M 10/04* (2006.01)
  *H01M 50/211* (2021.01)
  *H01M 50/242* (2021.01)
  *H01M 50/249* (2021.01)

(52) U.S. Cl.
  CPC ....... *H01M 50/211* (2021.01); *H01M 50/242* (2021.01); *H01M 50/249* (2021.01); *B60L 50/64* (2019.02); *H01M 2220/20* (2013.01)

(56) References Cited

U.S. PATENT DOCUMENTS

| | | | |
|---|---|---|---|
| 2012/0115004 A1* | 5/2012 | Park | H01M 50/209 |
| | | | 429/120 |
| 2013/0130087 A1 | 5/2013 | Kawaguchi et al. | |
| 2014/0030566 A1* | 1/2014 | Lee | H01M 50/209 |
| | | | 429/90 |
| 2014/0338995 A1* | 11/2014 | Mclaughlin | B60R 16/04 |
| | | | 180/68.5 |
| 2016/0028050 A1 | 1/2016 | Shiraishi | |
| 2017/0190264 A1* | 7/2017 | Kim | H01M 50/242 |
| 2017/0194676 A1 | 7/2017 | Omura | |
| 2018/0097211 A1 | 4/2018 | Choi et al. | |
| 2018/0138474 A1 | 5/2018 | Choi et al. | |
| 2018/0138561 A1 | 5/2018 | Lee et al. | |
| 2018/0261821 A1 | 9/2018 | Ogawa et al. | |
| 2018/0287116 A1 | 10/2018 | Seo et al. | |

FOREIGN PATENT DOCUMENTS

| | | |
|---|---|---|
| DE | 10 2010 051 010 A1 | 5/2012 |
| JP | 2002-8598 A | 1/2002 |
| JP | 2011-54368 A | 3/2011 |
| JP | 2013-16375 A | 1/2013 |
| JP | 2017-162810 A | 9/2017 |
| KR | 10-2007-0053949 A | 5/2007 |
| KR | 10-2016-0050843 A | 5/2016 |
| KR | 10-2017-0022119 A | 3/2017 |
| KR | 10-2017-0050443 A | 5/2017 |
| KR | 10-2018-0036863 A | 4/2018 |
| KR | 10-2018-0068379 A | 6/2018 |
| WO | WO2016/002178 A1 | 1/2016 |
| WO | WO2017/078249 A1 | 5/2017 |
| WO | WO2017/099513 A1 | 6/2017 |

OTHER PUBLICATIONS

Indian Office Action issued Aug. 10, 2022 in Application No. 202117009199.
International Search Report for PCT/KR2019/011825 mailed on Dec. 27, 2019.

* cited by examiner

BATTERY MODULE AND BATTERY PACK COMPRISING BATTERY MODULE

TECHNICAL FIELD

The present disclosure relates to a battery module, a battery pack including the battery module, and a vehicle including the battery pack.

The present application claims priority to Korean Patent Application No. 10-2018-0113243 filed on Sep. 20, 2018 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module having at least one battery cell first, and then configure a battery pack by using at least one battery module and adding other components.

If conventional battery module or battery pack is used for a long time, the battery cells are inflated to gradually increase the internal pressing force. Accordingly, the battery cells or the cover frame for accommodating the battery cells are damaged.

Thus, it is required to search for a battery module, which may prevent the cover frame or the battery cells from being damaged when the battery cells are inflated, a battery pack including the battery module, and a vehicle including the battery pack.

DISCLOSURE

Technical Problem

The present disclosure is directed to providing a battery module, which may prevent a cover frame from being damaged when battery cells are inflated, a battery pack including the battery module, and a vehicle including the battery pack.

Moreover, the present disclosure is also directed to providing a battery module, which may prevent battery cells frame from being damaged when the battery cells are inflated, a battery pack including the battery module, and a vehicle including the battery pack.

Technical Solution

In one aspect of the present disclosure, there is provided a battery module, comprising: a battery cell assembly having a plurality of battery cells stacked on each other; a pair of end plates provided at opposite sides of the battery cell assembly; and a cover frame coupled to the pair of end plates to cover the battery cell assembly, the cover frame being deformed along an inflating direction of the plurality of battery cells when the plurality of battery cells are inflated.

The inflating direction of the plurality of battery cells may be a direction toward the opposite sides of the battery cell assembly, and the cover frame may have an elastic deforming portion that is elastically deformed in the inflating direction when the plurality of battery cells are inflated.

The elastic deforming portion may be formed with a predetermined length along a longitudinal direction of the battery cell assembly and be provided in plural such that the plurality of elastic deforming portions are spaced apart from each other by a predetermined distance along the inflating direction.

The plurality of elastic deforming portions may convexly protrude out of the cover frame and be concavely formed at an inner side of the cover frame.

When the plurality of battery cells are inflated, the plurality of elastic deforming portions may be elastically deformed to become flat along the inflating direction.

The elastic deforming portion may have a groove shape with a predetermined size and be provided in plural such that the plurality of elastic deforming portions are spaced apart from each other by a predetermined distance along a longitudinal direction of the battery cell assembly.

The plurality of elastic deforming portions may include a center groove formed at a center of the cover frame to be formed convex along the longitudinal direction; a front edge groove spaced apart from the center groove and provided at a front edge of the cover frame; a plurality of front grooves disposed between the front edge groove and the center groove, spaced apart from each other by a predetermined distance along the longitudinal direction, and formed convex toward a front side of the cover frame; a plurality of rear grooves disposed to face the plurality of front grooves with the center groove being interposed therebetween, the plurality of rear grooves being formed convex toward a rear side of the cover frame; and a rear edge groove spaced apart from the plurality of rear grooves and provided at a rear edge of the cover frame.

When the plurality of battery cells are inflated, the center groove, the front edge groove, the plurality of front grooves, the plurality of rear grooves and the rear edge groove may be elastically deformed to become flat along the inflating direction.

The center groove may be convexly formed along the longitudinal direction.

In addition, the present disclosure provides a battery pack, comprising: at least one battery module according to the above embodiments; and a pack case configured to package the at least one battery module.

Advantageous Effects

According to various embodiments as above, it is possible to provide a battery module, which may prevent a cover frame from being damaged when battery cells are inflated, a battery pack including the battery module, and a vehicle including the battery pack.

Moreover, according to various embodiments as above, it is possible to provide a battery module, which may prevent battery cells frame from being damaged when the battery cells are inflated, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
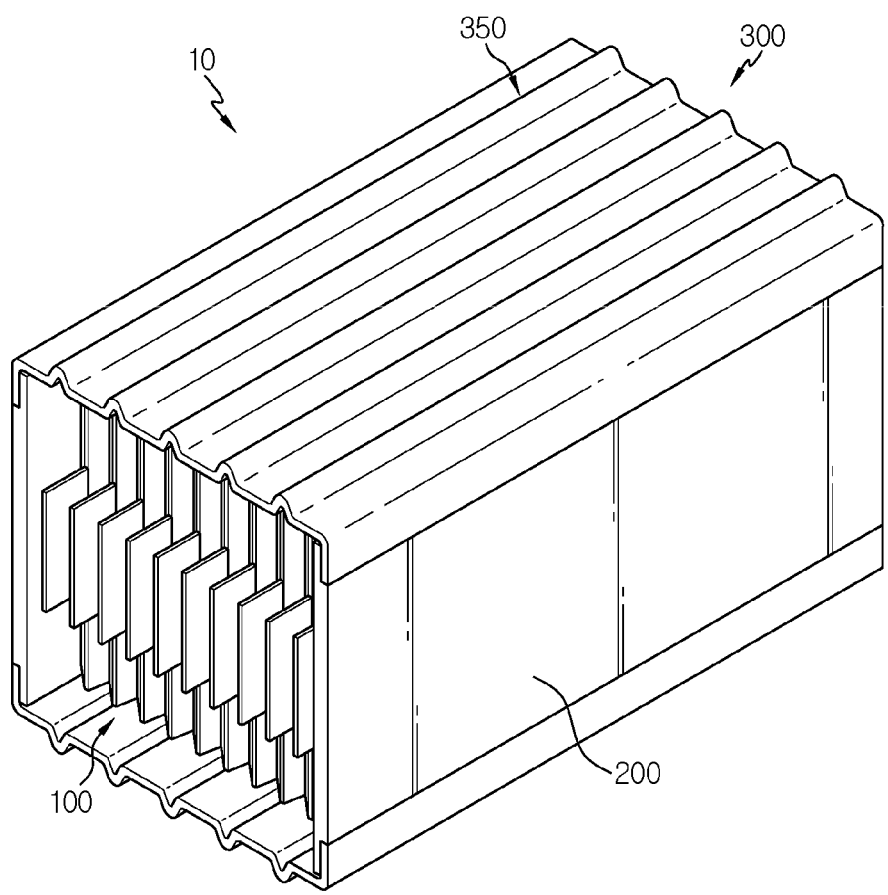
FIG. 1 is a diagram for illustrating a battery module according to an embodiment of the present disclosure.
Figure 2:
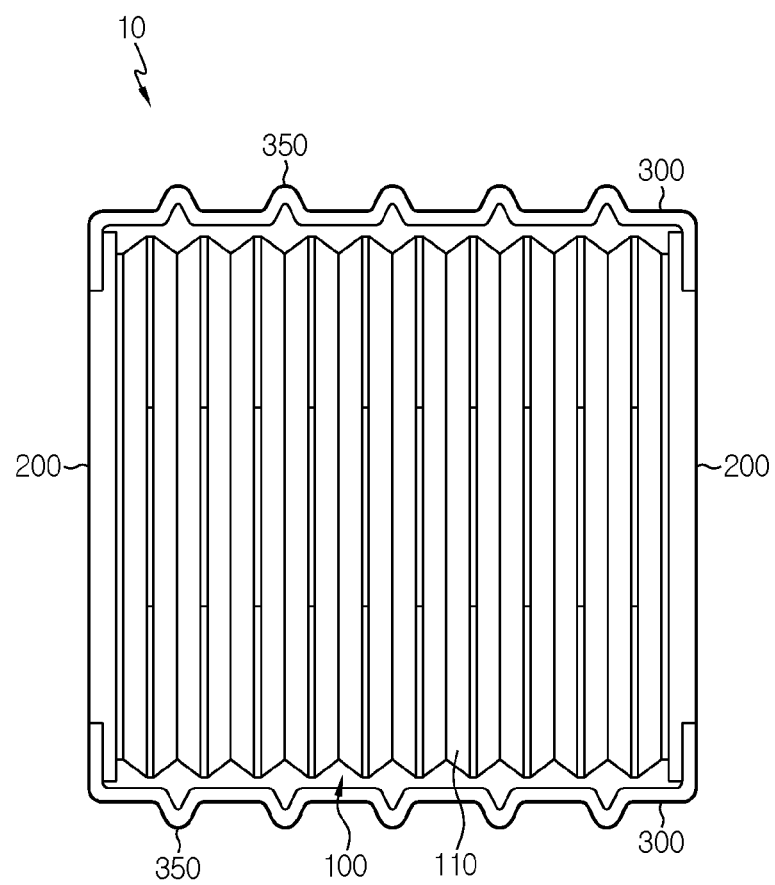
FIG. 2 is a cross-sectioned view showing the battery module of FIG. 1.
Figure 3:
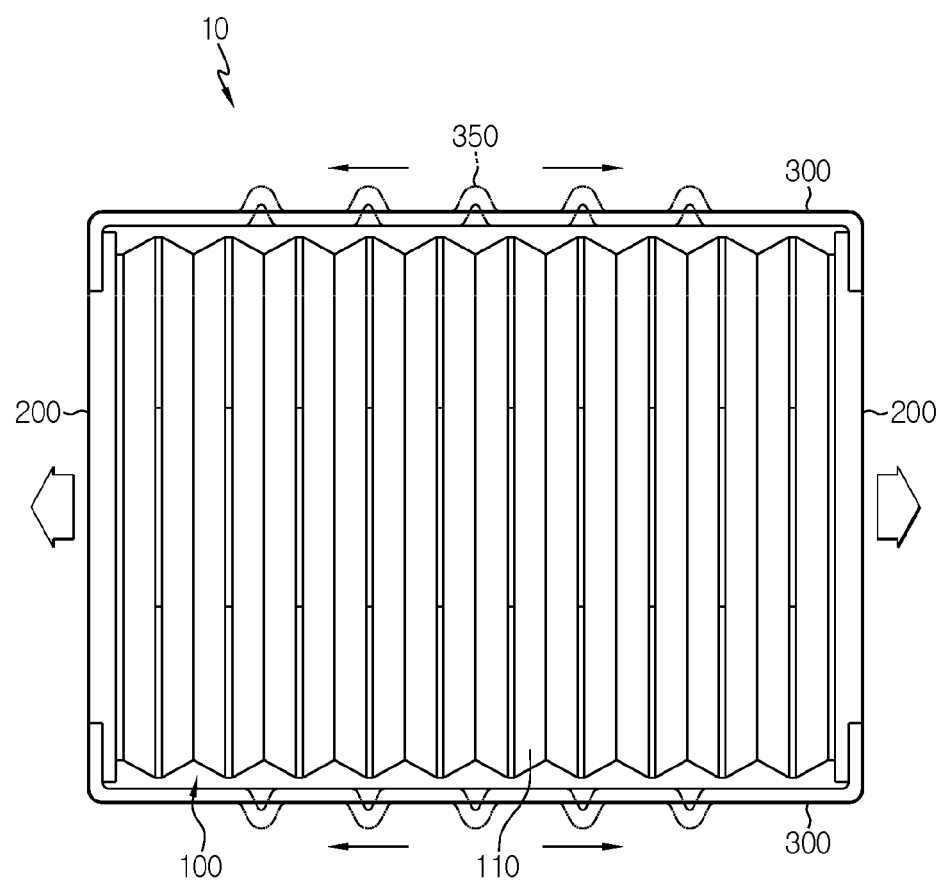
FIG. 3 is a diagram for illustrating the deformation of a cover frame when battery cells of the battery module of FIG. 1 are inflated.

FIG. 1 is a diagram for illustrating a battery module according to an embodiment of the present disclosure, FIG. 2 is a cross-sectioned view showing the battery module of FIG. 1, and FIG. 3 is a diagram for illustrating the deformation of a cover frame when battery cells of the battery module of FIG. 1 are inflated.

Referring to FIGS. 1 to 3, the battery module 10 may include a battery cell assembly 100, an end plate 200, and a cover frame 300.

The battery cell assembly 100 may have a plurality of battery cells 110. The plurality of battery cells 110 may be secondary batteries, particularly pouch-type secondary batteries. The plurality of battery cells 110 may be stacked on each other and electrically connected to each other.

The end plate 200 may be provided in a pair and may be provided at both sides of the battery cell assembly 100. The pair of end plates 200 may support both sides of the battery cell assembly 100.

The cover frame 300 may be coupled to the pair of end plates 200 to cover the battery cell assembly 100. The cover frame 300 may cover at least an upper side and a lower side of the pair of end plates 200.

When the plurality of battery cells 110 are inflated, the cover frame 300 may be deformed along the inflating direction of the plurality of battery cells 110. Here, the inflating direction of the plurality of battery cells 110 may be a direction toward both sides of the battery cell assembly 100, namely toward the pair of end plates 200.

The cover frame 300 may have an elastic deforming portion 350 for the elastic deformation.

When the plurality of battery cells 110 are inflated, the elastic deforming portion 350 may elastically deformed in the direction toward both sides of the battery cell assembly 100 to extend the cover frame 300 in the direction toward both sides of the battery cell assembly 100.

The elastic deforming portion 350 may be formed with a predetermined length along the longitudinal direction of the battery cell assembly 100, namely in the front and rear directions of the battery module 10, and may be provided in plural such that the plurality of elastic deforming portions 350 are spaced apart from each other by a predetermined distance along the direction toward both sides of the battery cell assembly 100.

The plurality of elastic deforming portions 350 may be formed to convexly protrude out of the cover frame 300 and may be concavely formed at an inner side of the cover frame 300, respectively.

When the plurality of battery cells 110 are inflated, the plurality of elastic deforming portions 350 may be elastically deformed to become flat along the direction toward both sides of the cover frame 300. When the plurality of battery cells 110 are inflated, the plurality of elastic deforming portions 350 may be elastically deformed to extend the cover frame 300 to a predetermined length in the inflating direction, thereby guiding deformation of the cover frame 300.

Accordingly, in this embodiment, it is possible to effectively prevent the inner pressing force of the battery module 10 from increasing beyond a predetermined magnitude by means of the elastic deforming portion 350 when the plurality of battery cells 110 are inflated.

Thus, in this embodiment, when the plurality of battery cells 110 are inflated, the elastic deforming portion 350 may prevent the pressing force of the battery module 10 from increasing beyond a predetermined magnitude, thereby significantly reducing the risk of damage of the battery cells 110 or the cover frame 300.

Figure 4:
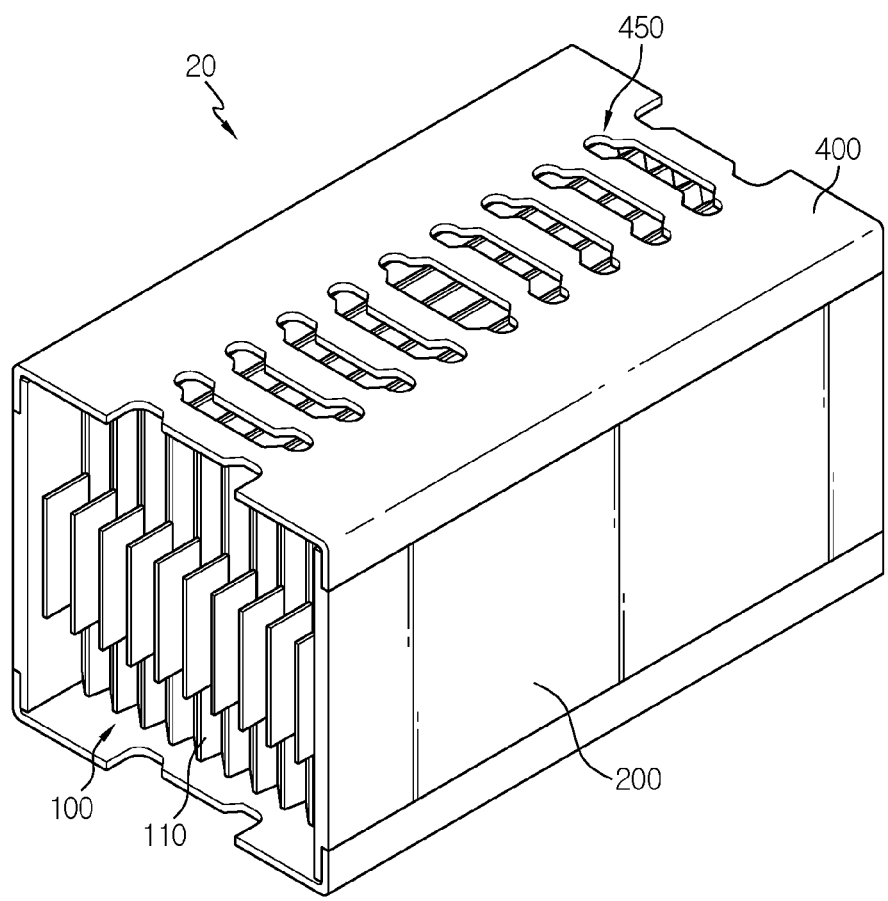
FIG. 4 is a diagram for illustrating a battery module according to another embodiment of the present disclosure.
Figure 5:
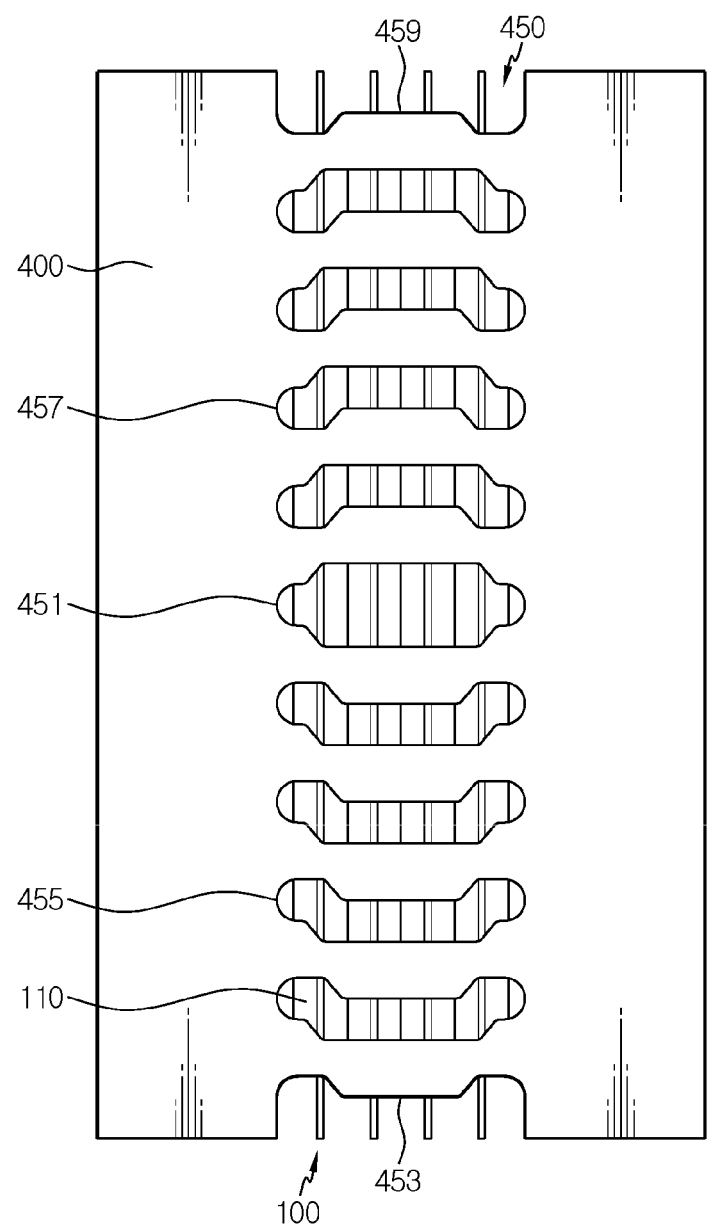
FIG. 5 is a diagram for illustrating a cover frame of the battery module of FIG. 4.
Figure 6:
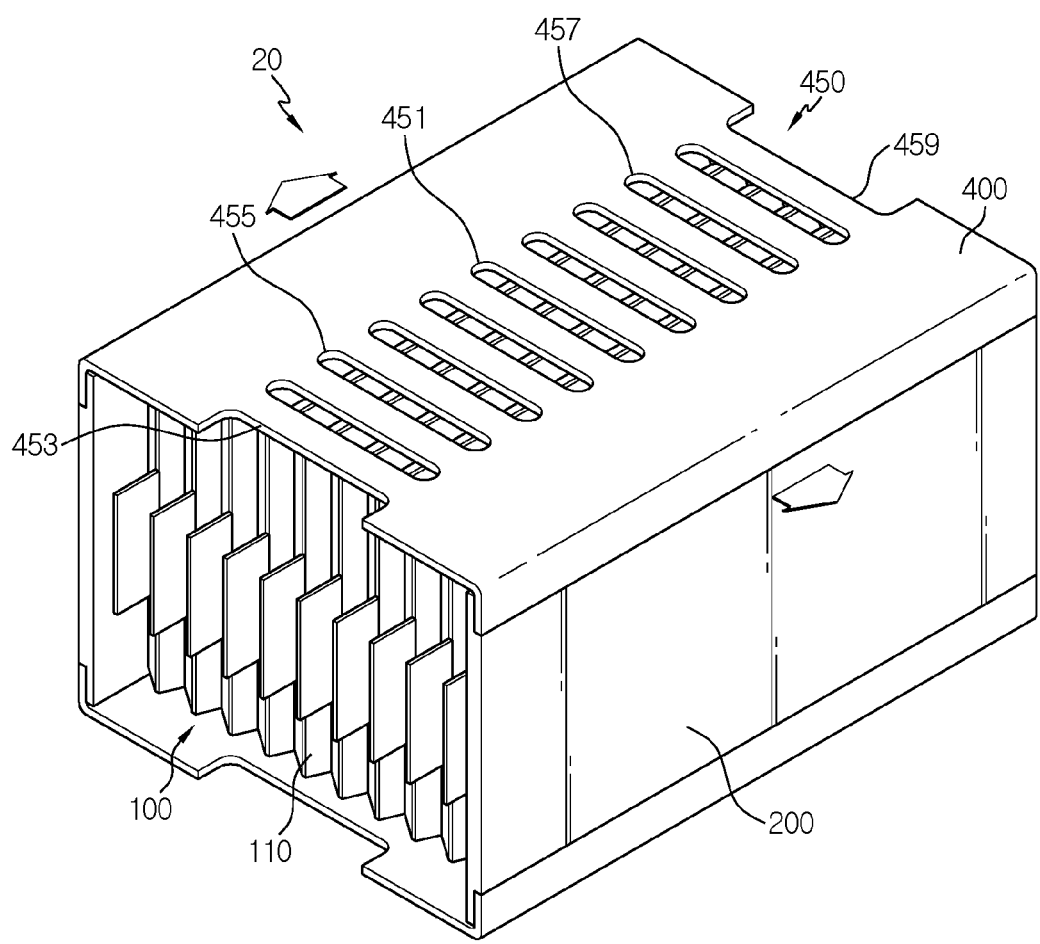
FIG. 6 is a diagram for illustrating the deformation of the cover frame when battery cells of the battery module of FIG. 4 are inflated.

FIG. 4 is a diagram for illustrating a battery module according to another embodiment of the present disclosure, FIG. 5 is a diagram for illustrating a cover frame of the battery module of FIG. 4, and FIG. 6 is a diagram for illustrating the deformation of the cover frame when battery cells of the battery module of FIG. 4 are inflated.

Since the battery module 20 according to this embodiment is similar to the battery module 10 of the former embodiment, the features identical or similar to those of the former embodiment will not described in detail, and features different from the former embodiment will be described in detail.

Referring to FIGS. 4 to 6, the battery module 20 may include a battery cell assembly 100, an end plate 200 and a cover frame 400.

The battery cell assembly 100 and the end plate 200 are substantially identical or similar to those of the former embodiment and thus will be described in detail.

The cover frame 400 may have an elastic deforming portion 450.

The elastic deforming portion 450 has a groove shape with a predetermined size and may be provided in plural such that the plurality of deforming portions 450 are spaced apart from each other by a predetermined distance along the longitudinal direction of the battery cell assembly 110.

The elastic deforming portion 450 may have a center groove 451, a front edge groove 453, a front groove 455, a rear groove 457, and a rear edge groove 459.

The center groove 451 may be formed at the center of the cover frame 400. The center groove 451 may be convexly formed along the front and rear directions of the cover frame 400.

The front edge groove 453 may be spaced apart from the center groove 451 at the front side of the cover frame 400. The front edge groove 453 may be provided at the front edge of the cover frame 400.

The front groove 455 may be provided in plural and disposed between the front edge groove 453 and the center groove 451. The front grooves 455 may be spaced apart from each other by a predetermined distance along the front and rear direction of the cover frame 400 and be formed convex toward a front side of the cover frame 400.

The rear groove 457 is provided in plural, and the plurality of rear grooves 457 are disposed to face the plurality of front grooves 455 with the center groove 451 being interposed therebetween. The rear groove 457 may be formed convex toward a rear side of the cover frame 400.

The rear edge groove 459 may be spaced apart from the plurality of rear grooves 457. The rear edge groove 459 may be provided at a rear edge of the cover frame 400.

When the plurality of battery cells 110 are inflated, the center groove 451, the front edge groove 453, the plurality of front grooves 455, the plurality of rear grooves 457, and the rear edge groove 459 may be elastically deformed to become flat along the direction toward both sides of the cover frame 400.

Accordingly, when the plurality of battery cells 110 are inflated, the elastic deforming portion 450 may extend the cover frame 400 by a predetermined length in the inflating direction to guide deformation of the cover frame 400.

As described above, the elastic deforming portion 450 may be formed with a plurality of straps with a bent groove shape capable of elastically extending the cover frame 400, instead of the shape of the former embodiment.

Figure 7:
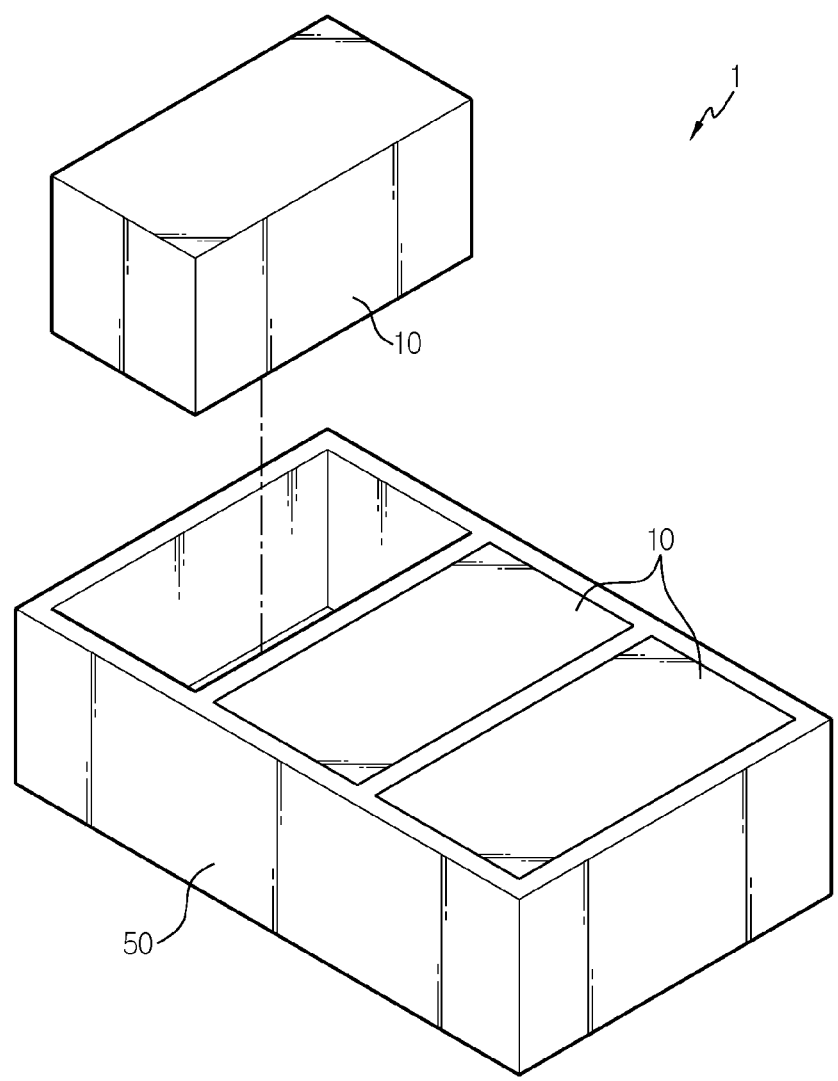
FIG. 7 is a diagram for illustrating a battery pack according to an embodiment of the present disclosure.
Figure 8:
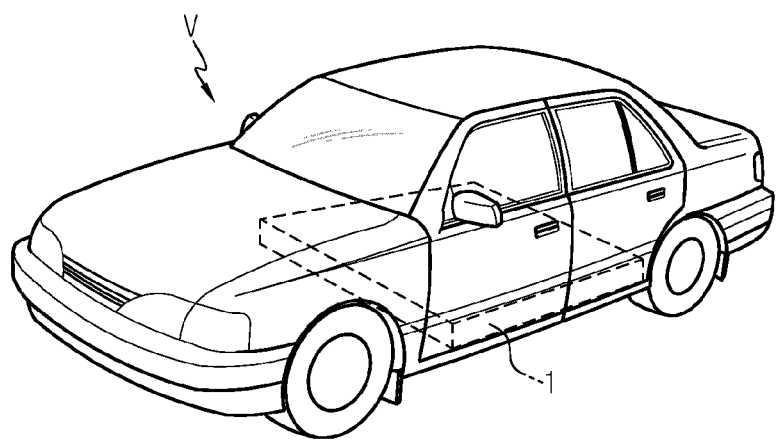
FIG. 8 is a diagram for illustrating a vehicle according to an embodiment of the present disclosure.

FIG. 7 is a diagram for illustrating a battery pack according to an embodiment of the present disclosure, and FIG. 8 is a diagram for illustrating a vehicle according to an embodiment of the present disclosure.

Referring to FIGS. 7 and 8, a battery pack 1 may include at least one battery module 10 according to the former embodiment and a pack case 50 for packaging the at least one battery module 10.

The battery pack 1 may include at least one battery module 20 of the former embodiments, or may include both the battery modules 10, 20 of the former embodiments.

The battery pack 1 may be provided to a vehicle V as a fuel source of the vehicle V. As an example, the battery pack 1 may be provided to a vehicle V such as an electric vehicle, a hybrid vehicle, and various other-type vehicles capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities such as a vehicle V, which have the battery pack 1, include the battery module 10, 20 as described above, and thus it is possible to implement a battery pack 1 having all the advantages of the battery module 10, 20 described above, or devices, instruments, facilities or the like such as a vehicle V, which have the battery pack 1.

According to various embodiments as above, it is possible to provide the battery module 10, 20, which may prevent the cover frame 300, 400 from being damaged when the battery cells 110 are inflated, the battery pack 1 including the battery module 10, 20, and the vehicle V including the battery pack 1.

Moreover, according to various embodiments as above, it is possible to provide the battery module 10, 20, which may prevent the battery cells 110 frame from being damaged when the battery cells 110 are inflated, the battery pack 1 including the battery module 10, 20, and the vehicle V including the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   a battery cell assembly having a plurality of battery cells stacked on each other;
   a pair of end plates provided at opposite sides of the battery cell assembly, each end plate of the pair of end plates having a recess formed in an outer surface; and
   a cover frame coupled to the pair of end plates to cover the battery cell assembly, the cover frame being deformed along an inflating direction of the plurality of battery cells when the plurality of battery cells are inflated,
   wherein both ends of the cover frame are bent to partially cover and fit with the recesses of the pair of the end plates in the inflating direction of the plurality of battery cells,
   wherein a length of each bent end is equal to a length of a respective one of the recesses, and
   wherein the bent ends and the end plates are coplanar.

2. The battery module according to claim 1, wherein the inflating direction of the plurality of battery cells is a direction toward the opposite sides of the battery cell assembly, and
   wherein the cover frame has an elastic deforming portion that is elastically deformed in the inflating direction when the plurality of battery cells are inflated.

3. The battery module according to claim 2, wherein the elastic deforming portion is formed with a predetermined length along a longitudinal direction of the battery cell assembly and is provided in plural such that the plurality of elastic deforming portions are spaced apart from each other by a predetermined distance along the inflating direction.

4. The battery module according to claim 3, wherein the plurality of elastic deforming portions convexly protrude out of the cover frame and are concavely formed at an inner side of the cover frame.

5. The battery module according to claim 4, wherein when the plurality of battery cells are inflated, the plurality of elastic deforming portions are elastically deformed to become flat along the inflating direction.

6. The battery module according to claim 2, wherein the elastic deforming portion has a groove shape with a predetermined size and is provided in plural such that the plurality of elastic deforming portions are spaced apart from each other by a predetermined distance along a longitudinal direction of the battery cell assembly.

7. The battery module according to claim 6, wherein the plurality of elastic deforming portions include:
   a center groove formed at a center of the cover frame to be formed convex along the longitudinal direction;
   a front edge groove spaced apart from the center groove and provided at a front edge of the cover frame;
   a plurality of front grooves disposed between the front edge groove and the center groove, spaced apart from each other by a predetermined distance along the longitudinal direction of the cover frame, and formed convex toward a front side of the cover frame;
   a plurality of rear grooves disposed to face the plurality of front grooves with the center groove being interposed therebetween, the plurality of rear grooves being formed convex toward a rear side of the cover frame; and
   a rear edge groove spaced apart from the plurality of rear grooves and provided at a rear edge of the cover frame.

8. The battery module according to claim 7, wherein when the plurality of battery cells are inflated, the center groove, the front edge groove, the plurality of front grooves, the plurality of rear grooves and the rear edge groove are elastically deformed to become flat along the inflating direction.

9. The battery module according to claim 7, wherein the center groove is convexly formed along the longitudinal direction.

10. A battery pack, comprising:
    at least one battery module according to claim 1; and
    a pack case configured to package the at least one battery module.

11. The battery module according to claim 1, wherein the outer surface of each bent ends is coplanar with an outer surface of a respective one of the pair of end plates.

12. The battery module according to claim 1, wherein each bent end is flat and has an inner surface contacting a respective one of the pair of end plates.

13. A battery module, comprising:
    a battery cell assembly having a plurality of battery cells stacked on each other;
    a pair of end plates provided at opposite sides of the battery cell assembly; and
    a cover frame coupled to the pair of end plates to cover the battery cell assembly, the cover frame being deformed along an inflating direction of the plurality of battery cells when the plurality of battery cells are inflated,
    wherein the inflating direction of the plurality of battery cells is a direction toward the opposite sides of the battery cell assembly,
    wherein the cover frame has an elastic deforming portion that is elastically deformed in the inflating direction when the plurality of battery cells are inflated, wherein the elastic deforming portion is provided in plural, and
    wherein the plurality of elastic deforming portions include:
    a center groove formed at a center of the cover frame to be formed convex along a longitudinal direction;
    a front edge groove spaced apart from the center groove and provided at a front edge of the cover frame;
    a plurality of front grooves disposed between the front edge groove and the center groove, spaced apart from each other by a predetermined distance along the longitudinal direction of the cover frame, and formed convex toward a front side of the cover frame;
    a plurality of rear grooves disposed to face the plurality of front grooves with the center groove being interposed therebetween, the plurality of rear grooves being formed convex toward a rear side of the cover frame; and
    a rear edge groove spaced apart from the plurality of rear grooves and provided at a rear edge of the cover frame.

* * * * *